(12) United States Patent
Lowe et al.

(10) Patent No.: US 6,709,121 B1
(45) Date of Patent: Mar. 23, 2004

(54) LIGHTBANK WITH RELEASABLE SUPPORT ROD MOUNTS

(75) Inventors: Gregory E. Lowe, Berthoud, CO (US); Thomas M. Frost, Oakdale, CA (US)

(73) Assignee: Chimera Company, Boulder, CO (US)

( * ) Notice: Subject to any disclaimer, the term of this patent is extended or adjusted under 35 U.S.C. 154(b) by 0 days.

(21) Appl. No.: 10/254,448

(22) Filed: Sep. 24, 2002

(51) Int. Cl.⁷ .............................................. G03B 15/02
(52) U.S. Cl. ............................. 362/18; 362/3; 362/352; 362/358; 362/367
(58) Field of Search .............................. 362/16, 17, 18, 362/3, 320, 378, 352, 360, 358, 367, 278

(56) References Cited

U.S. PATENT DOCUMENTS

| | | | |
|---|---|---|---|
| 4,052,607 A | * 10/1977 | Larson | 362/18 |
| 4,446,506 A | 5/1984 | Larson | |
| 4,594,645 A | * 6/1986 | Terashita | 362/18 |
| 4,669,031 A | 5/1987 | Regester | |
| 5,023,756 A | 6/1991 | Regester | |
| 6,010,234 A | * 1/2000 | Rahn | 362/320 |
| 6,076,935 A | 6/2000 | Kester | |
| 6,176,598 B1 | * 1/2001 | Seligman et al. | 362/352 |

OTHER PUBLICATIONS

"Lowel Rifa–lite Instructions", Warnings/Basic Operations, Lowel–Light Manufacturing, Inc., Brooklyn, NY.

* cited by examiner

Primary Examiner—Laura K. Tso
(74) Attorney, Agent, or Firm—James R. Young; Faegre & Benson LLP

(57) ABSTRACT

A releasable attachment for a support rod of a lightbank assembly includes a rod anchor block that has at least one hole for receiving and retaining a proximal end of a support rod and is pivotally mounted in relation to a frame, such as a typical ring-shaped frame of the light bank assembly. A releasable latch mechanism, such as a pivotal lever or a slidable pin, with a latch surface engages a latch surface on or in the rod anchor block to releasably latch the rod anchor block against pivotal movement in relation to the frame, when the support rod and a reflector hood and diffuser panel mounted on the support rod, are extended to their outstretched, use configuration.

25 Claims, 4 Drawing Sheets

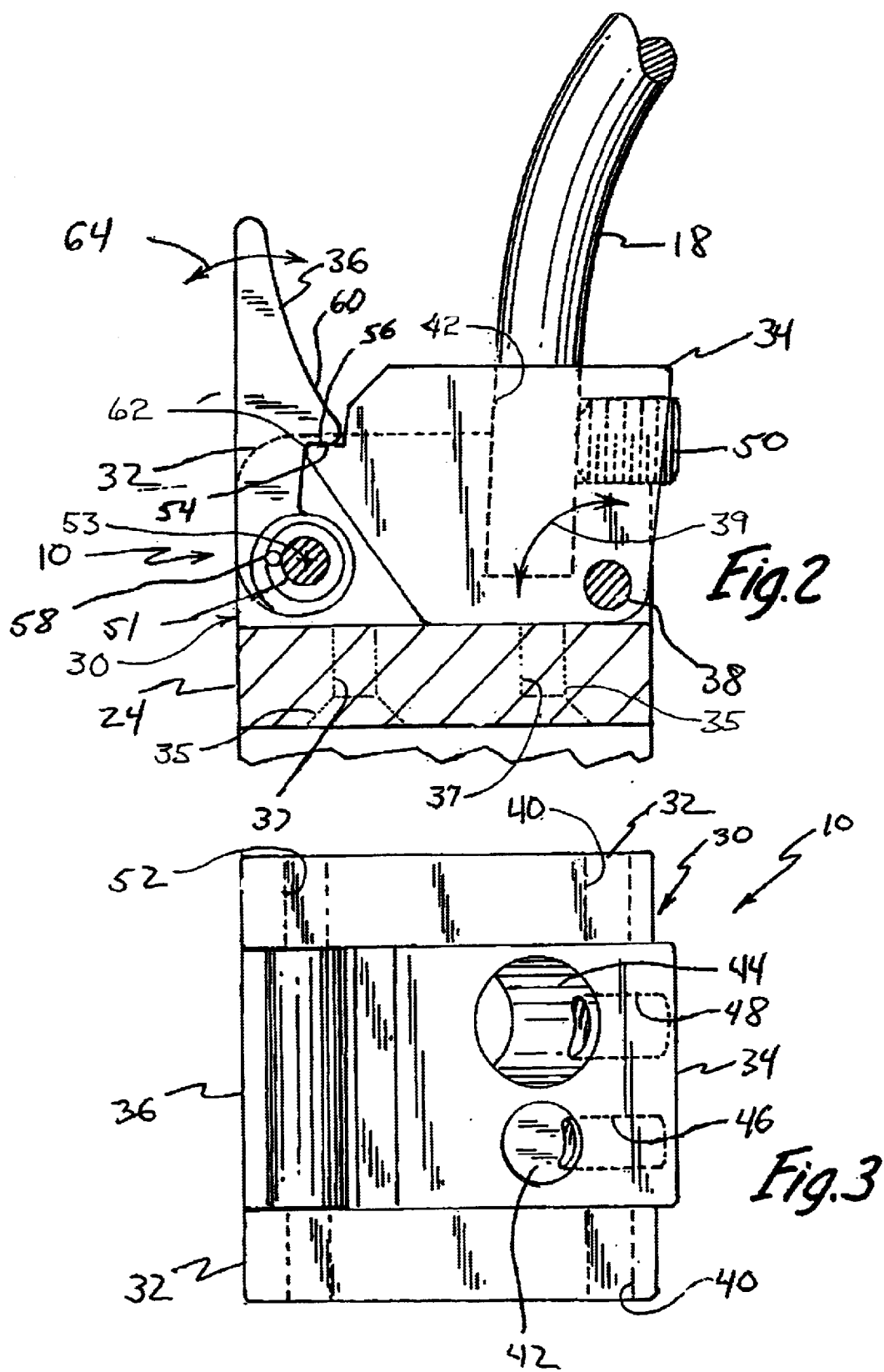

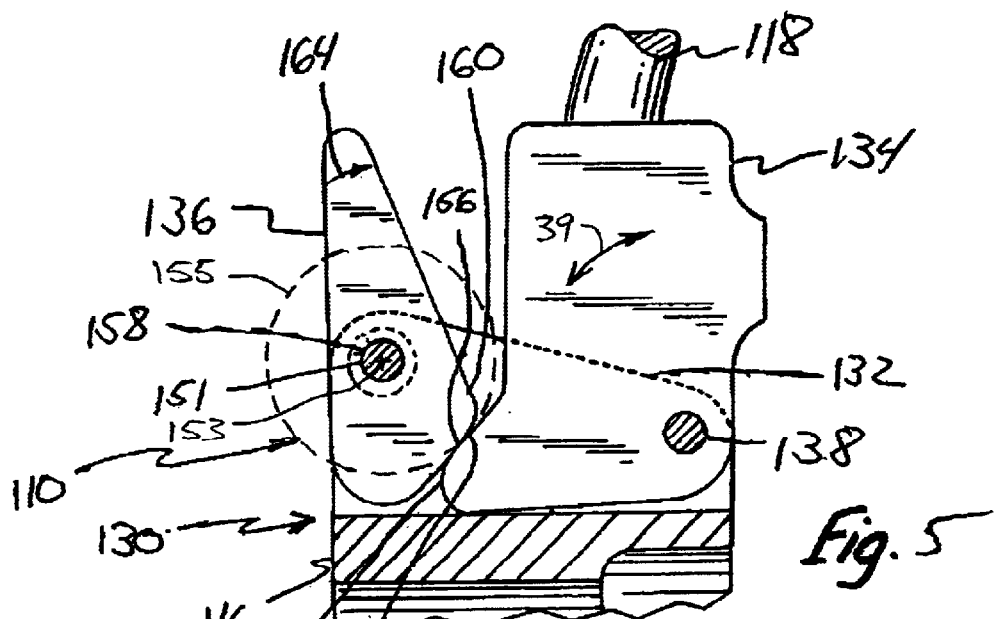
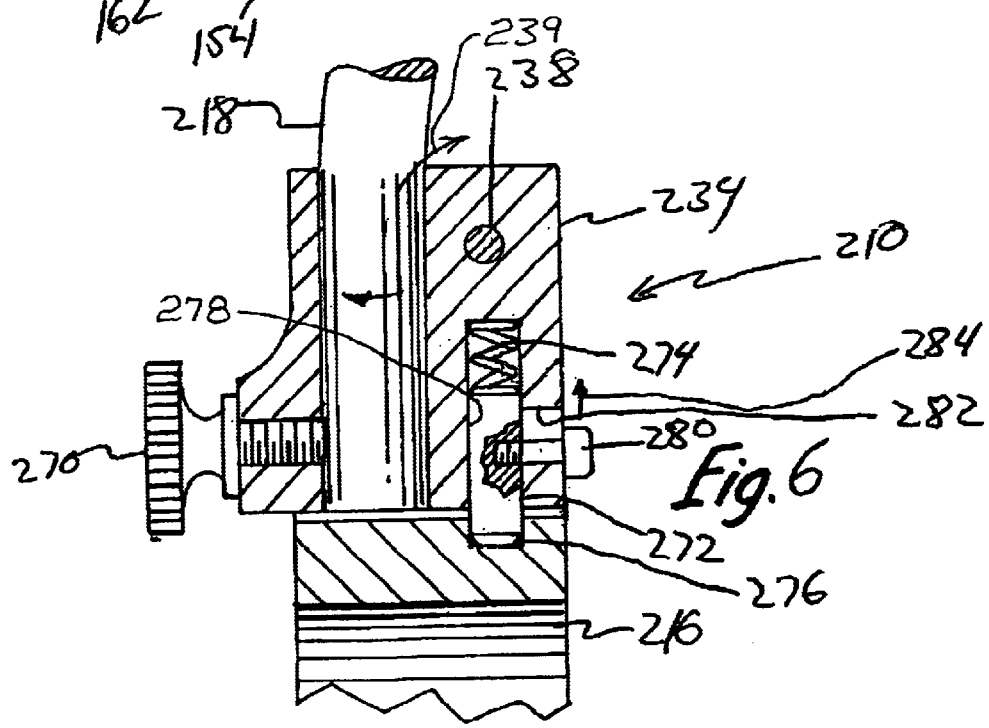

LIGHTBANK WITH RELEASABLE SUPPORT ROD MOUNTS

FIELD OF THE INVENTION

The present invention relates generally to photographic diffuser lightbanks or soft boxes and more specifically to releasable rod or pole anchors for rods or poles that support lightbanks in extended, outstretched configuration.

BACKGROUND OF THE INVENTION

Photographic diffuser lightbanks, also sometimes known as light boxes or soft boxes, are commonly used by photographers and film makers to control the distribution of light on subjects. Devices of these types are disclosed, for example, in the following U.S. patents:

| Inventor | U.S. Pat. No. |
| --- | --- |
| Larson | 4,446,506 |
| Regester | 4,669,031 |
| Regester | 5,023,756 |
| Kester | 6,076,935 |

Lightbank assemblies typically include a diffuser panel for scattering light rays emanating from a bright light source, which may include a light bulb or filament, a hood or body formed from fabric or other soft material with a reflective interior surface for confining and directing the light rays from the light source to the diffuser panel, and a support structure for supporting the reflective hood and diffuser panel over the light source. The mounting structure typically comprises a ring-shaped frame or other mounting component for attachment of the light bank assembly to the light source, and a plurality of support rods or poles that extend forwardly and outwardly from the ring-shaped frame to support the reflective hood and diffuser panel. The support rods or poles are usually formed from resilient metal, graphite, plastic, or other materials that can be bowed against an inherent bias or resistance by application of external forces, but which spring back to their original shapes upon removal of such forces. One common approach for mounting the support rods or poles to the ring-shaped frame includes cylindrical holes in the ring-shaped frame. In lightbank assemblies of these types, the proximal ends of the respective support rods are inserted into the holes in the ring-shaped frame so that they extend forwardly and outwardly from the ring-shaped frame at an angle that will cause them to be resiliently strained or deformed into a bowed or arced state when the reflective hood is mounted on the rods, while the fabric of the reflective hood body is stretched in tension. This combination of bowing and tensile forces or stresses enables the rods to support and hold the reflector hood and diffuser panel of the lightbank in their operative position extending forward and outward from the ring-shaped frame.

Before, after, and even during photography and video sessions, it is often necessary to move the lightbanks. Since many lightbanks are relatively large and bulky, it is often desirable that they be collapsed, folded, or otherwise broken down or disassembled before they can be transported efficiently. Unfortunately, it can be difficult to collapse lightbanks of the type described above. The tension in the reflective hood body mounted on the strained and deformed support rods or poles generates considerable compressive forces between the proximal ends of the rods and the surfaces of the holes in the ring-shaped frame in which they are anchored as well as between the distal ends of the rods and the outer edges of the reflective hood that are mounted on the distal ends of the rods, thereby making it difficult to remove the ends of the rods from the holes in the frame. In order to remove the support rods from the holes in the frame and collapse these lightbanks it is necessary to force the rods into even more compression and further deform them enough to pull either the proximal end out of the hole in the ring-shaped frame or to disconnect the distal end of the rod from the reflective hood body. A relatively high degree of physical strength can be required to undertake this action, especially in large light bank assemblies.

There remains, therefore, a continuing need for lightbank assemblies that can be conveniently extended and collapsed. An example of an attempt to alleviate this problem is illustrated in U.S. Pat. No. 6,076,935, issued to Kester, in which Velcro™ end flaps and pockets have some benefits, but they still require much physical strength and manipulation, especially in mounting. Therefore, they work best for smaller lightbank structures.

Another approach is used in the Lowel Rifa-lite™, manufactured by Lowel Light Manufacturing, Inc., in Brooklyn, N.Y., wherein the reflective hood and support rods are shaped and assembled in a manner that has some similarities to an umbrella for extending and collapsing the reflective hood. It has the attractive feature of the rods being permanently attached to the ring-shaped fame, which slides longitudinally on a central pole or base. However, that assembly is better suited to small lightbank structures.

Consequently, in spite of those prior art lightbank structures, there remains a need for a better rod mounting or anchoring device that works well and is convenient for large, as well as small, lightbank assemblies. To be commercially viable, any such assemblies must be capable of being efficiently manufactured.

SUMMARY OF THE INVENTION

The present invention is an improved lightbank assembly that can be conveniently set up and collapsed. One embodiment of the invention includes a plurality of pivotal and latchable anchor blocks pivotally mounted on a ring-shaped fame for mounting the support rods or poles of a light bank assembly to a base of light source. The latchable anchor blocks or mounts are movable between an operative or latched position at which the support rods are anchored in the blocks and extended forwardly and outwardly to extend and support the lightbank reflective hood and diffuser panel in an outstretched configuration, and a released position at which the support rods and reflective hood can be collapsed. Other embodiments of the invention include clamps for releasably clamping the mounts in the operative position.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the drawings:

FIG. 2 is a detailed side elevation view, partially in cross-section, of a pivotal and latchable support rod anchor block mount for the light bank assembly in its operative position, taken along section line 2—2 in FIG. 1;

FIG. 3 is a top view of the anchor block mount shown in FIG. 2, but with the support rod removed to reveal the anchor mounting holes for the support rod;

FIG. 5 is a detailed partial sectional view, similar to FIG. 2, but of a second embodiment of a releasable support rod mount in accordance with the present invention, in its operative position; and FIG. 6 is a detailed partial sectional view of a third embodiment of a releasable support rod mount in accordance with the present invention, in its operative position.

DETAILED DESCRIPTION OF THE PREFERRED EMBODIMENTS

Figure 1:
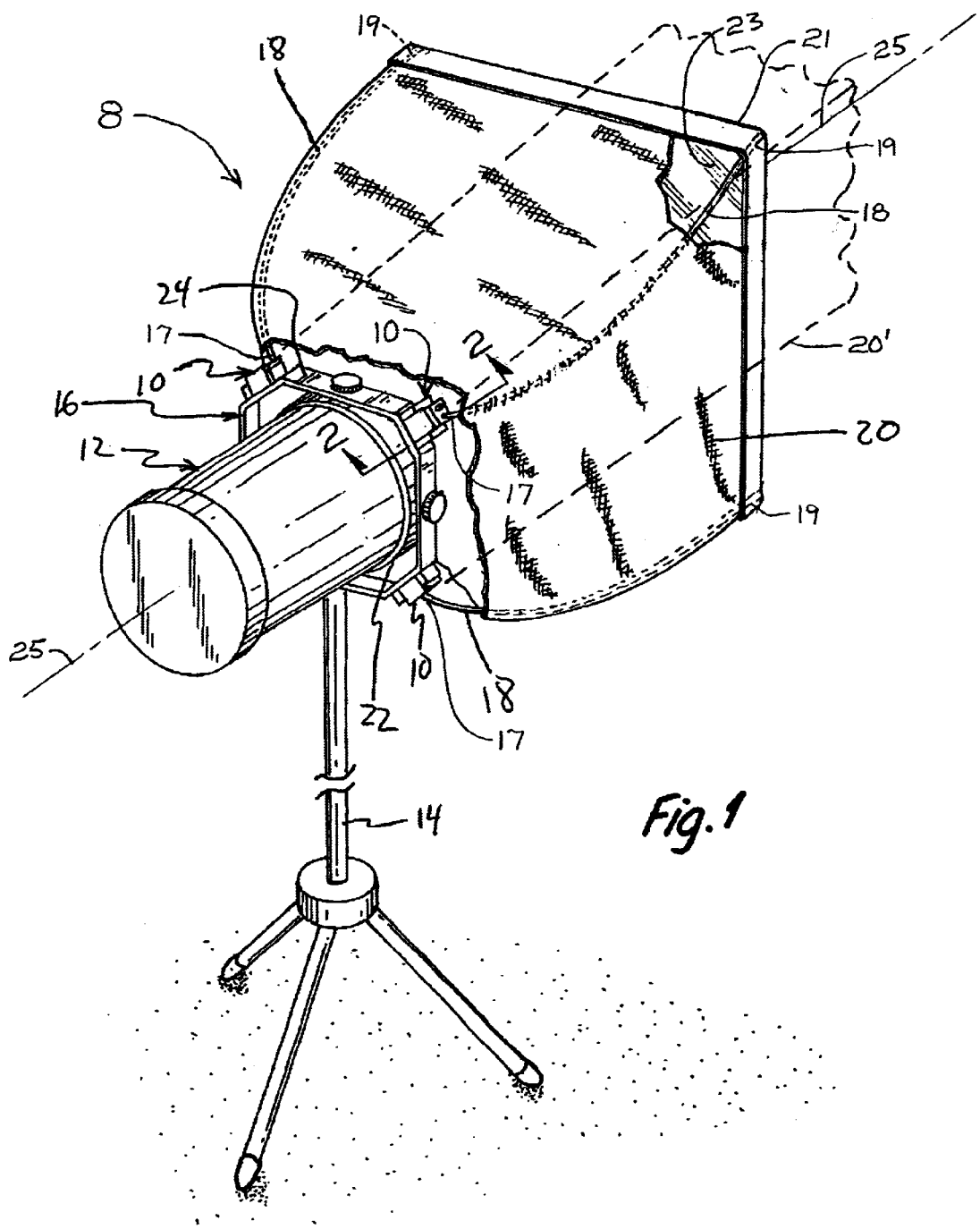
FIG. 1 is an isometric view of a lightbank assembly, including a releasable mount in accordance with the present invention, mounted to a light source and with portions of the proximal and distal ends of the reflector hood cut away to reveal the pivotal support rod anchor blocks and diffuser panel components.

A lightbank assembly 8 including releasable gimbals or pivotal support rod mounts 10 in accordance with a first embodiment of the invention is illustrated generally in FIG. 1. The lightbank assembly 8 is shown mounted to a light source 12, which may include an electric light bulb, filament, or other light producing element, supported by a stand 14. In addition to the pivotal support rod mounts 10, the lightbank assembly 8 includes a ring-shaped frame 16, which is often called simply a ring, a plurality of support rods 18 and a light reflection hood 20 made of fabric or other soft, flexible, sheet material with a reflective interior surface supported by the rods 18. A light diffuser panel 21 is mounted on the distal ends 19 of the support rods 18 over the open end of the reflector hood 20. The diffuser panel 21 comprises a translucent sheet 23 of material that transmits, but scatters or diffuses light produced by the light source 12. Ring 16 is configured for mounting the lightbank assembly 8 to the light source 12. While there are many sizes and configurations of ring-shaped frames that are suitable for this invention, the illustrated embodiment of ring 16 includes a mounting member 22 that is mounted directly to the light source 12 and a frame 24 that is mounted to and extends around the mounting member 22. The support rod mounts 10 are attached to the frame 24 of ring 16 in this particular embodiment, such as by screws, welding, or the like. In other embodiments (not shown) the support rod mounts 10 can be attached directly to the mounting member 22 of the ring 16 or to any other sturdy part of the ring structure. Therefore, references herein to components mounted in pivotal relation to the ring or frame include direct pivotal mounting to the ring or frame or indirect pivotal mounting, such as, for example, pivotal mounting to another component that is, in turn, attached to the ring or frame.

Support rods 18 are connected to, or anchored in, the ring 16 by the releasable mounts 10. The support rods 18, or at least portions of the rods, are usually formed from resilient metal, polymers, graphite, or other materials that are bendable or deformable by external forces, but which spring back to their original shape upon release of such forces. Rods of these types are well known and commercially available from a number of photographic equipment suppliers including Chimera Company of Boulder, Colo. When the releasable mounts 10 are in the operative position shown in FIG. 1, the support rods 18 will be bowed or arced from their neutral state and apply sufficient tension to the reflector hood material 20 of the lightbank assembly 8 to fully extend and outstretch the light reflector hood 20 and diffuser 21. The strained support rods 18 effectively function as a support frame for the reflector hood 20 and diffuser panel 21. When the mounts 10 are in their released position (not shown in FIG. 1), the mounts 10, and therefore the support rods 18, move toward one another, thereby relieving the tension applied to the reflector hood 20 and allowing the support rods 18 and reflector hood 20 to be collapsed into a reduced volume. In FIG. 1, solid lines are used to illustrate the reflector hood 20 in its extended or outstretched state or a configuration for use, and broken lines illustrate the reflector hood 20 in its collapsed state 20'. The lightbank assembly 8 can be relatively easily transported when collapsed.

A significant feature of this invention is the pivotal mounting blocks 10 for mounting and anchoring the support rods 18 to the ring 16. These mounting blocks 10 are latched or pinned in a non-pivotal relation to the ring 16, when the support rods 18 and reflector hood 20 are outstretched in their use configuration, as described above. However, the mounting blocks 10 can be unlatched or unpinned, as will be described in more detail below, to release the mounting blocks 10 to pivot about respective pivot axes to allow the support rods 18 and reflector hood 20 to collapse toward the longitudinal axis 25 of the lightbank assembly 8, as shown by the phantom lines 20' in FIG. 1. As used herein, latching and pinning accomplish the same result, as will become more clear as the description proceeds, so these terms may be used interchangeably at times and one should not be construed to exclude the other, but should be construed to include the other. To facilitate this operation, the pivot axes of the respective mounting blocks 10 preferably lie in a plane that is perpendicular to the longitudinal axis 25, although other orientations of the pivot axes would also work. For opening or outstretching the reflective hood, each support rod 18, when anchored in the pivotal support block 10, can be grasped and forcibly pulled, or pushed outwardly, away from the longitudinal axis 25, to its outstretched, use position, as shown in FIG. 1, as the pivotal mounting block 10 pivots along and reaches a latch position where it can be latched or pinned to hold the support rod 18 and reflector hood 20 in their outstretched positions.

Figure 4:
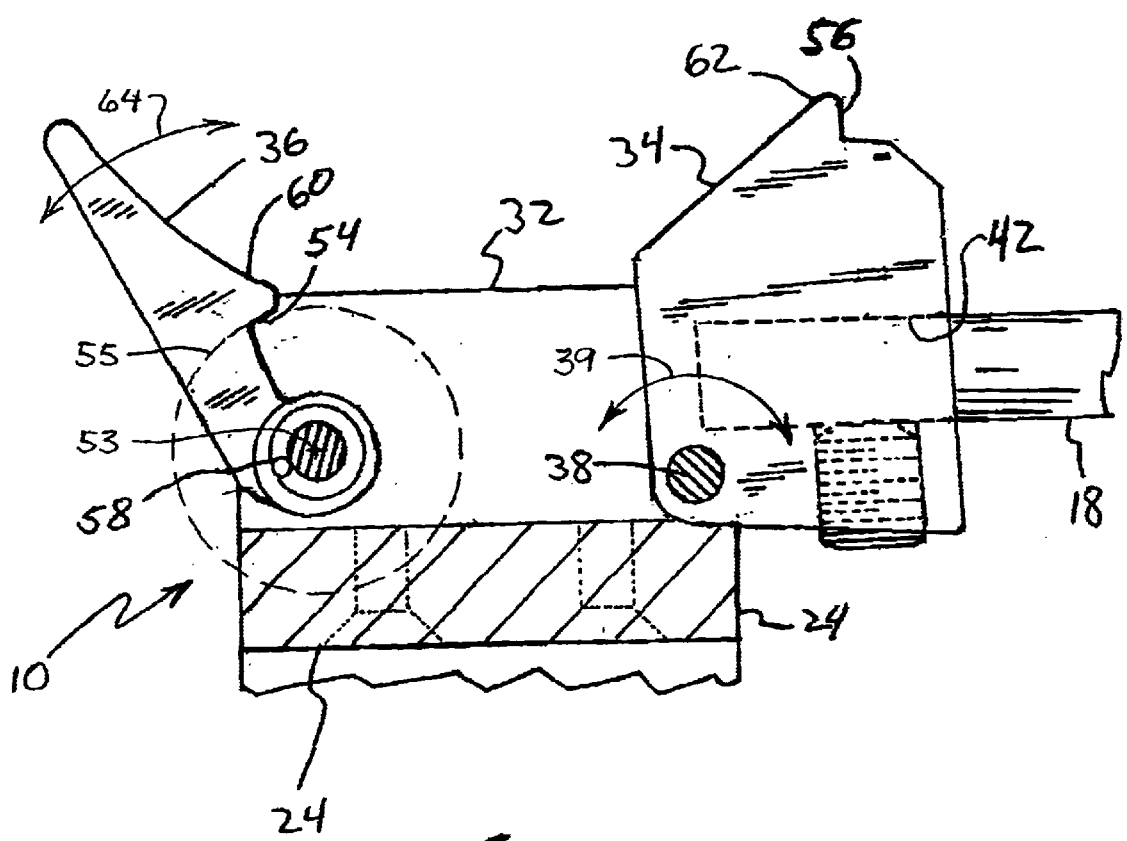
FIG. 4 is a detailed partial sectional view of the support rod mount similar to FIG. 2, but with the anchor block unlatched and pivoted to its released position.

Referring now to FIGS. 2, 3 and 4, the pivotal mounts or mounting blocks 10 include a base 30 that comprises at least one, but preferably two spaced apart, journal boxes or members 32 for supporting or holding a pivot pin 30 that defines a pivot axis, a rod anchor block 34 (sometimes called a rod block, anchor block, or block) mounted on the pivot pin 38 to pivot or rotate about the pivot axis, and some kind of latch or pin to releasably fix or prevent the rod anchor block 34 from pivoting or rotating about the pivot axis. In the embodiment shown in FIGS. 2, 3, and 4, the latch comprises a release lever 36 mounted on a latch pivot pin 51 and which has a first latch surface 54 that interlaces with a second or mating latch surface 56 on the rod anchor block 34 to releasably prevent the rod anchor block 34 from pivoting or rotating about the pivot axis of pivot pin 38. The base 30 can be attached to the ring 16 by screws 35 or other fasteners that extend through holes 37 in the frame 24 into members 32 or by welding (not shown) or any other attachment method. The base 30 could also be an integral part of the ring 16, or it could be a separate component that could have a plate (not shown) or other component that extends under the anchor block 34 to support the two journal boxes 32 and that is attachable to the ring form 24. Persons skilled in the art will be able to devise any number of other pivotal mounting structures for this invention, which should not be limited to any particular one that is shown or described here for enablement and best mode purposes. Rod anchor block 34 is pivotally mounted to the base 30 by the pivot pin 38, which extends into the rod anchor block 34 and into holes 40 in members 32. The pivot pin 38 can be rotatable in either the journal box members 32 or the rod anchor block 34, or both, to allow rod anchor block 34 to pivot or rotate, as indicated by arrow 39, between the operative position shown in FIGS. 2 and 3 (causing the rods 18 to be strained and the reflective hood 20 to be under tension) and the released position shown in FIG. 4 (causing the rods 18 and reflective hood 20 to be collapsed).

The rod anchor block 34 includes a cylindrical hole 42 for receiving the proximal end 17 of a support rod 18. Another optional hole 44 with a different diameter and/or extending at a different angle into the rod anchor, block 34 can be provided to accommodate a different sized rod 18 and/or a different sized reflection hood 20. For example, smaller reflector hoods 20 (not shown) usually have smaller diameter support rods 18 (not shown) that extend at a larger angle outwardly from the longitudinal axis 25 than larger reflector hoods 20 with larger diameter support rods 18, and the optional hole 44 with the different diameter and different angular orientation than hole 42 accommodates such different sizes. Also, optional threaded bores 46 and 48 extending through the block 34 and into intersection with holes 42 and 44, respectively, and can be used with fasteners, such as set screw 50, to further secure the proximal end 17 of the support rod 18 in the anchor block 34.

Rod anchor block 34 is releasably clamped or latched in its operative position by latch lever 36. The latch lever 36 is rotatably mounted to the base 30 by pivot pin 51, which extends into the lever 36 and through holes 52 in members 32. The pivot pin. 51 allows the lever 36 to rotationally move, as shown by arrow 64, between a clamped or latched position shown in FIG. 2 and a released position shown in FIG. 4. A lip surface 54 on the lever 36 engages a shoulder surface 56 on the rod anchor block 34 when the rod anchor block 34 is in the operative position and the lever 36 is in the clamped or latched position (FIG. 2). A spring 58, such as a piano spring, cooperatively mounted between the lever 36 and base 30 biases the level 36 toward the clamped or latched position. The lever 36 also has a transition surface 60 adjacent the lip 54 that cooperates with cam edge 62 on the shoulder 56 of rod block 34 to cam the latch lever 36 against the bias of spring 58 as the anchor block 34 is pivoted toward the latched, operative position.

It is preferred tat the first latch surface 54 of lever 36 be substantially perpendicular to a radial line (not shown) that extends from the lever pivot axis 53 through the latch surface 54 so that the latch lever 36 can be moved without unnecessary resistance toward the unlatched position, when the anchor block 32 is under a lot of stress from the loaded rod 18, yet is also effective to secure the latch in the operative position of FIG. 2, when the rod 18 is loaded. The mating latch surface 56 an anchor block 34 is also preferably in that same orientation, when the anchor block 34 is in its latched, use position, as shown in FIG. 2. In other words, the latch surface 54 is essentially tangential to, or an arc of, a circle 55 that is concentric to the lever axis 53, and the second latch surface 56 aligns and mates with the first latch surface 54, when the lever 36 and anchor block 34 are in the latched position.

When setting up lightbank assembly 8, a technician will insert the proximal ends 17 of support rods 18 into the holes, such as 42, of the rod anchor block 34. This maneuver can be performed when the rod anchor block 34 is in the operative position shown in FIG. 2 or in the released position shown in FIG. 4. If a support rod 18 is inserted into the rod anchor block 34 when the rod anchor block 34 is in the released position, the technician will typically grasp the rod 18 and rotate the rod 18 and anchor block 34 toward the operative position. As this rotation is taking place, the cam edge 62 on the rod anchor block 34 will engage the transition surface 60 on the lever 36 and urge or cam the lever 36 toward its release position against the bias force of spring 58 until the cam edge 62 passes the end of lever lip 54 and the anchor block 34 reaches its operative position. Once the rod anchor block 34 has reached the operative position, the spring bias force on the lever 36 will cause the lever 36 to move to its clamped or latched position with the first latch surface 54 on lever 36 engaging the second latch surface 56 on anchor block 34 and thereby hold the rod anchor block 34 in the operative position against the force applied to the anchor block 34 by the strained rod 18. The technician can easily collapse the reflective hood 20 by grasping and moving lever 36 toward the release position (away from the rod block 34 in the direction of arrow 64 in FIG. 2), thereby disengaging the lever 36 from the rod anchor block 34.

Releasable mount 110, a second embodiment of the present invention, for mounting and holding a light bank support rod 118 is illustrated in FIG. 5. Releasable mount 110 is similar to mount 10 described above, and features with similar functions are indicated by similar reference numbers. As shown, the mount 110 includes a base 130 having a pair of journal boxes or members 132 (only one is shown) integrally mounted to ring 116. A rod anchor block 134 and a release lever 136 are pivotally mounted to the base 130 by pivot pins 138 and 151, respectively. The lever 136 is biased toward its clamped or latched position by spring 158. The lip surface 154 and transition surface 160 of release lever 136 cooperate with the shoulder surface 156 and cam edge 162 of the rod anchor block 134 to enable the rod anchor block 134 to be moved to and held in its clamped or latched position (shown in FIG. 5). To collapse a reflector hood with mount 110, the technician will move the lever 136 toward the release position (toward the rod anchor block 134 in the direction of arrow 164), thereby disengaging the lever 136 from the rod anchor block 134. Again, it is preferred for latching security and releasing ease, although not essential, that the principal mating portions of the latch ice 154, 156 be substantially tangential to, or an arc of, a circle 155 that is concentric with the lever pivot axis 153.

Releasable mount 210, a third embodiment of the present invention, is illustrated in FIG. 6. Releasable mount 210 is similar to mount 10 described above, and features with similar functions are indicated by similar reference numbers. The mount 210 includes a base having a pair of journal boxes or members (not visible in FIG. 6, but similar to the journal boxes or members 32 of FIGS. 2, 3, and 4) integrally mounted to a ring 216 on opposite sides of a rod anchor block 234. The rod anchor block 234 is pivotally mounted to the journal boxes or members of the base by pivot pin 238 so that it can be pivoted as indicated by arrow 239 about the pivot axis defined by the pivot pin 238. A fastener such as thumbscrew 270 is used to secure the support rod 218 in the rod block 234. Rather tan the levers such as 36 and 136 of the embodiments of the invention described above, mount 210 includes a release pin 272, which releasably engages a hole 276 in the ring 216 in any other base component (not shown) that can be mounted on, or affixed to, ring 216. Pin 272 is mounted for reciprocal motion in a cylindrical hole 278 in the rod anchor block 234. A spring 274 biases the pin 272 toward its clamped or latched position (shown in FIG.

6) at which an end of the pin extends from the rod anchor block 234 and into engagement with the hole 276 when the rod anchor block 234 is in the operative position. A knob 280 on a bolt, which is attached transversely to the pin 272, extends through a slotted hole 282 in the rod anchor block 234 to retain the pin 272 within the rod anchor block 234 when the pin 272 is not engaged with the hole 276 of the ring 216. To collapse a reflective hood of a lightbank assembly with mount 210, the technician will move the knob 280 toward the release position (in the direction of arrow 284), thereby disengaging the pin 272 from the ring 216, and allowing the anchor block 234 to pivot about pivot pin 238, as shown by arrow 239.

Since these and numerous other modifications and combinations of the above-described method and embodiments will readily occur to those skilled in the art, it is not desired to limit the invention to the exact construction and process shown and described above. Accordingly, resort may be made to all suitable modifications and equivalents that fall within the scope of the invention as defined by the claims which follow. The words "comprise," "comprises," "comprising," "include," "including," and "includes" when used in this specification and in the following claims are intended to specify the presence of stated features or steps, but they do not preclude the presence or addition of one or more other features, steps, or groups thereof.

The embodiments of the invention in which an exclusive property or privilege is claimed are defined as follows:

1. A lightbank assembly, including a light source, a ring-shaped frame positioned around the light source, a flexible and collapsible reflective hood mounted on a plurality of support rods that extend forwardly and outwardly from their proximal ends adjacent the ring-shaped frame to their distal ends at a distance away from the ring-shaped frame, and a light diffuser panel mounted on the distal ends of the support rods to enclose an open end of the reflector hood, the lightbank assembly characterized by:

a plurality of rod anchor blocks disposed around and attached in a pivotal relationship to the ring-shaped frame, each rod anchor block having an anchor hole for receiving and retaining the proximal end of one of the support rods and oriented so that pivotal movement of the rod anchor blocks in relation to the ring-shaped frame causes support rods mounted in the rod anchor blocks to move toward and away from a longitudinal axis that extends through the light source, ring-shaped frame, reflector hood, and diffuser panel; and a latch mechanism associated with each of the rod anchor blocks that releasably latches and restrains the rod anchor block against pivotal movement in relation to the ring-shaped frame when the rod anchor block is positioned with the support rod anchored therein extended to support the reflector hood and diffuser panel in outstretched, use configuration.

2. The lightbank assembly of claim 1, wherein the pivot axis of each rod anchor block lies in a plane that is perpendicular to the longitudinal axis.

3. The lightbank assembly of claim 1, wherein the latch mechanism includes a first latch surface on a latch lever that is pivotally mounted in relation to the ring-shaped frame, and a second latch surface on the rod anchor block that matingly engages the first latch surface when the rod anchor block is pivoted to the use position in which the support rod mounted therein and the reflector hood and diffuser panel mounted on the support rod are outstretched in the use configuration.

4. The lightbank assembly of claim 3, wherein the latch lever is pivoted about a latch axis to disengage the first latch surface on the latch lever from the second latch surface on the rod anchor block.

5. The lightbank assembly of claim 4, wherein the first latch surface on the latch lever and the second latch surface on the rod anchor block are tangential to a circle that is concentric with the latch axis when the rod anchor block and the latch lever are positioned to- engage the first latch surface with the second latch surface.

6. The lightbank assembly of claim 1, wherein the latch mechanism includes a latch pin mounted in the rod anchor block that is movable into latching engagement with a surface that is immovable in relation to the ring-shaped frame when the rod anchor block is pivoted to the use position in which the support rod mounted therein and the reflector hood and diffuser panel mounted on the support rod are outstretched in the use configuration.

7. The lightbank assembly of claim 5, wherein a component that is in immovable relation to the ring-shaped frame has a hole aligned with the latch pin when the rod anchor block is pivoted to the use position, and wherein the hole has a sidewall that forms the surface that is immovable in relation to the ring-shaped frame.

8. A lightbank assembly, including:

a ring for mounting the lightbank assembly to a light source;

a plurality of resilient support rods extending from the ring;

a reflector hood supported by the support rods; and a plurality of releasable mounts for attaching the support rods to the ring, the releasable mounts being movable between an operative position at which the support rods are bowed to extend the reflective hood, and a released position at which the support rods and reflective hood can be collapsed and a latch associated with each of said releasable mounts for releasably retaining the mounts in their operative positions.

9. The lightbank assembly of claim 8, wherein the releasable mounts include support rod anchor blocks mounted to the ring for pivotal movement between the operative and released positions.

10. The lightbank assembly of claim 9, wherein the releasable mounts include said latches for releasably retaining the support rod anchor blocks in the operative position.

11. The lightbank assembly of claim 10, wherein the latches include a release lever biased toward a latching position for releasably engaging the support rod anchor blocks.

12. The lightbank assembly of claim 10, wherein the latches include a release lever.

13. The lightbank assembly of claim 10, wherein the latches include a release pin biased toward a latching position.

14. The lightbank assembly of claim 13, wherein the release pins are mounted in the support rod anchor blocks for releasably engaging the ring.

15. The lightbank assembly of claim 8, wherein the latches include clamps for releasably latching the mounts in the operative position.

16. The lightbank assembly of claim 15, wherein each clamp includes a release lever biased to a clamping position.

17. The lightbank assembly of claim 15, wherein each clamp includes a release pin biased to a clamping position.

18. A releasable support rod mount for a lightbank assembly, the support rod mount including:

a rod anchor block for receiving a support rod, the rod block being movable between an operative position at which the support rod is bowed to extend a lightbank, and a released position at which a support rod and lightbank can be collapsed;

a pivot mount for mounting the rod anchor block for pivotal movement between the operative and released positions; and a clamp, including a release lever, for releasably retaining the support rod block in the operative position.

19. The support rod mount of claim 18, wherein the release lever is biased toward a clamping position for releasably engaging the support rod blocks.

20. A releasable support rod mount for a lightbank assembly, the support rod mount including:

a rod anchor block for receiving a support rod, the rod block movable between an operative position at which the support rod is bowed to extend a lightbank, and a released position at which a support rod and lightbank can be collapsed; and a pivot mount for mounting the rod anchor block for pivotal movement between the operative and released positions; and a latch clamp including a release pin for releasably retaining the support rod block in the operative position.

21. The support rod mount of claims 20, wherein the release pin is biased toward a clamping position.

22. The support rod mount of claim 21, wherein the release pin is mounted in the rod anchor block.

23. A method of mounting support rods for a reflector hood and diffuser panel to a frame of a lightbank assembly, comprising:

inserting a proximal end of a support rod into a mating hole in a rod anchor block that is mounted on the lightbank assembly in pivotal relation to the frame;

pivoting the rod anchor block with the support rod inserted in the hole to a use position in which the support rod, as well as the reflector hood and diffuser panel that are mounted on the support rod, are extended forwardly and outwardly in outstretched, use configuration; and latching the rod anchor block in that use position into immovable relation to the frame.

24. The method of claim 23, including latching the rod anchor block into immovable relation to the frame by engaging a latch surface on a lever that is pivotally mounted in relation to the frame with a mating latch surface on the rod anchor block.

25. The method of claim 23, including latching the rod anchor block into immovable relation to the frame by extending a pin into both the rod anchor block and a component that is immovable in relation to the frame.

* * * * *